United States Patent [19]
Dunstan et al.

[11] 4,197,933
[45] Apr. 15, 1980

[54] LINEAR INDUCTION DRIVE SYSTEM FOR ACCELERATING AND DECELERATING MOVING WALKWAY

[75] Inventors: Phillip E. Dunstan; Charles H. McConnell, both of Seattle, Wash.

[73] Assignee: The Boeing Company, Seattle, Wash.

[21] Appl. No.: 857,433

[22] Filed: Dec. 5, 1977

[51] Int. Cl.² .......................................... B65G 17/00
[52] U.S. Cl. .................................. 198/334; 104/290; 198/619; 198/792
[58] Field of Search ............... 198/619, 334, 690, 805, 198/792, 832, 834; 104/25, 148 LM; 310/12, 13, 14; 105/49

[56] References Cited

U.S. PATENT DOCUMENTS

| | | | |
|---|---|---|---|
| 3,548,751 | 12/1970 | Izhelya | 104/148 LM |
| 3,577,928 | 5/1971 | Victorri | 104/148 LM |
| 3,651,763 | 3/1972 | Iritani | 198/334 X |

OTHER PUBLICATIONS

*Traction and Normal Forces in the Linear Induction Motor,* Ooi and White, IEEE Transactions on Power Apparatus and Systems, vol. PAS 89, No. 4, Apr. 1970.

*Primary Examiner*—Robert B. Reeves
*Assistant Examiner*—Douglas D. Watts
*Attorney, Agent, or Firm*—Christensen, O'Connor, Johnson & Kindness

[57] ABSTRACT

A linear induction drive system for an accelerating and decelerating moving walkway comprising a plurality of interconnected platforms that encompass the entire path of travel of the walkway and overlap one another by a small portion of their length in linear constant speed zones and by a substantial portion of their length in acceleration and deceleration zones is disclosed. The linear induction drive system comprises a plurality of stationary linear induction motor stators located in the constant speed zones. Affixed to the platforms are reaction rails formed of a plurality of links rotatably attached to one another such that the links are linearly aligned with one another in the constant speed zones and fold in an accordian manner in the acceleration and deceleration zones. In the constant speed zone the reaction rails are driven by power applied to the linear induction motor stators. Due to the platform interconnection this drive force moves the entire walkway. The links fold in a plane parallel to the plane of motion of the platforms. Preferably, a pair of links are associated with each platform—one link rotatably attached to each platform and the other links rotatably connecting the platform links together. Each link is flat and elongate, and comprises at least two laminations. One lamination is formed of an electrical conducting nonmagnetic material, such as aluminum or copper. The other lamination is formed of a magnetic material, such as iron.

28 Claims, 9 Drawing Figures

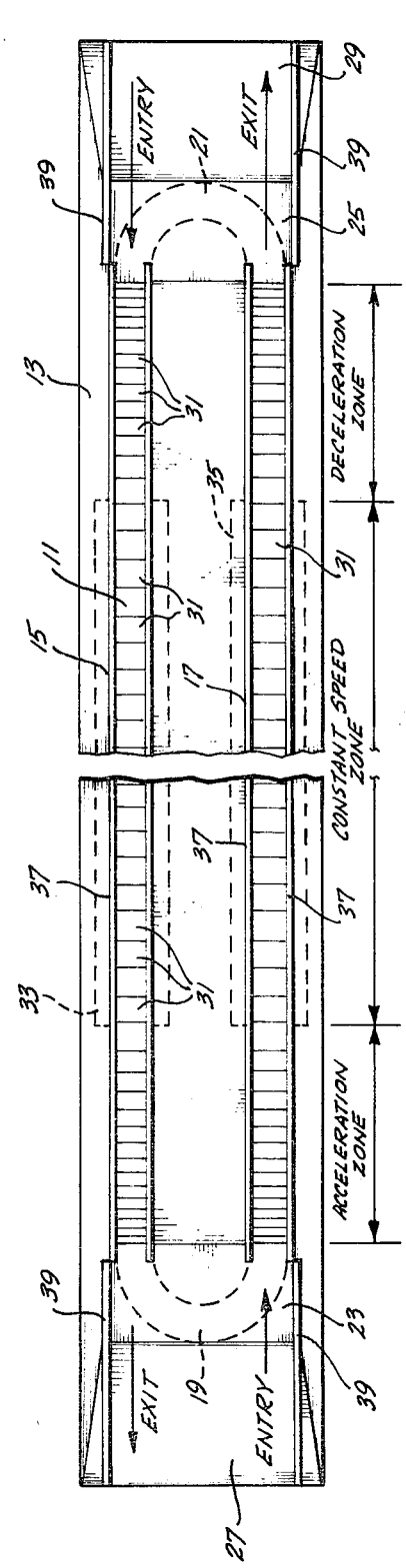
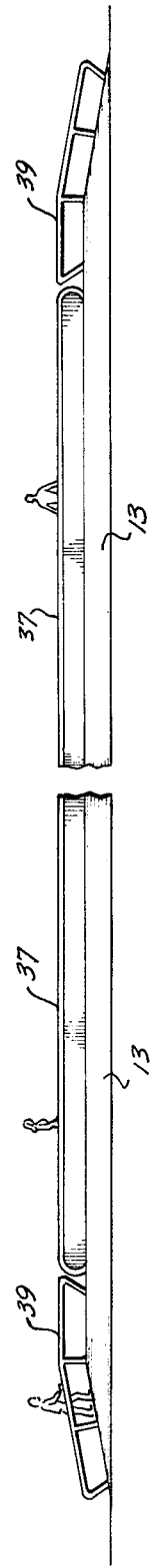

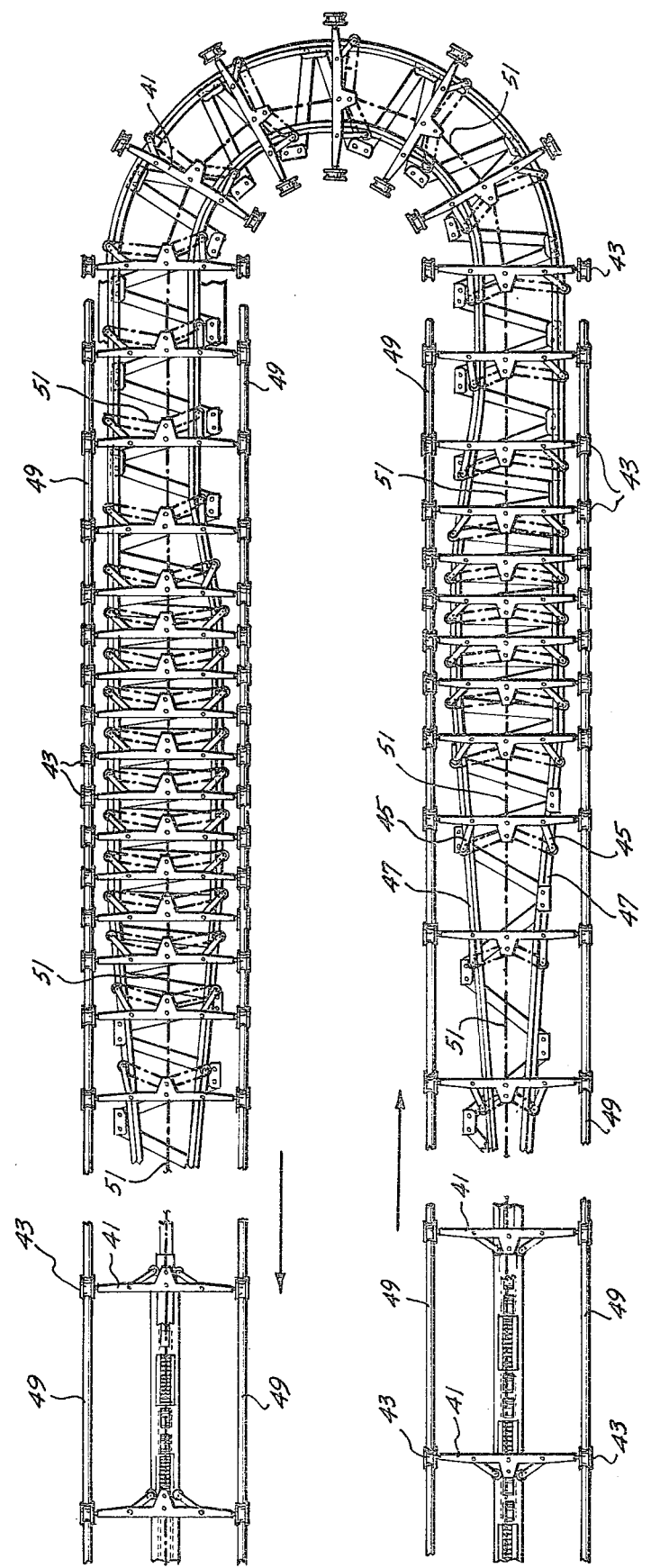

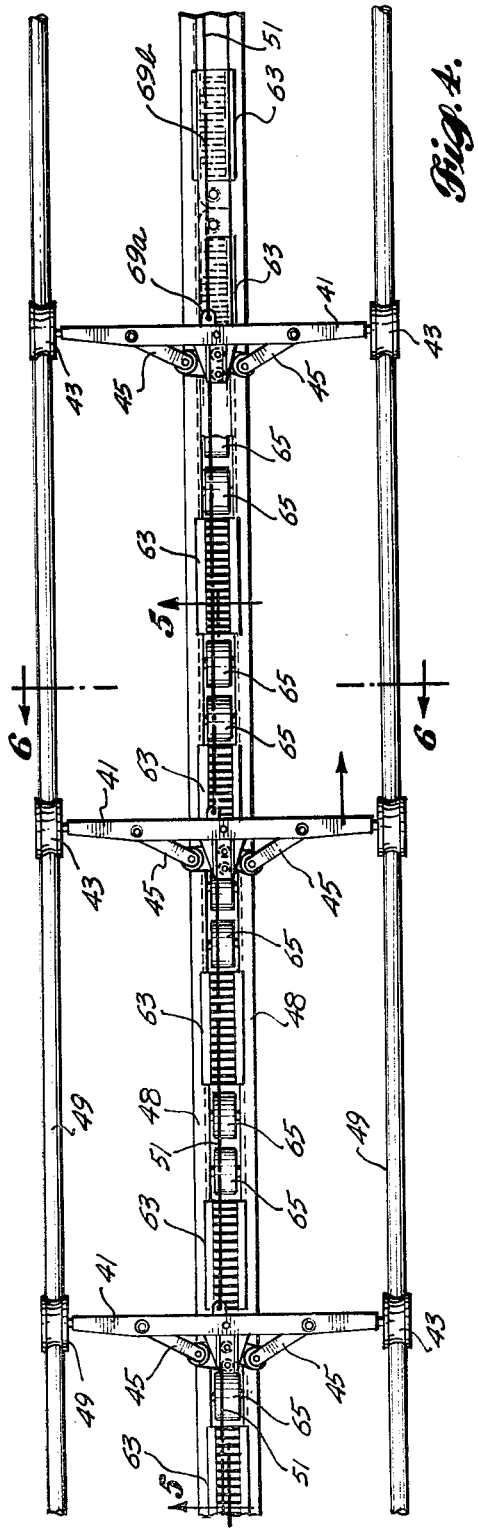

LINEAR INDUCTION DRIVE SYSTEM FOR ACCELERATING AND DECELERATING MOVING WALKWAY

BACKGROUND OF THE INVENTION

This invention is directed to drive systems for moving walkways and, more particularly, to drive systems for accelerating and decelerating moving walkways.

In the past, a wide variety of moving walkways, some with and some without accelerating and decelerating zones have been proposed. One walkway that includes accelerating and decelerating zones is described in U.S. Pat. No. 3,939,959 entitled "Accelerating and Decelerating Moving Walkway" by Phillip Dunstan et al. The accelerating and decelerating moving walkway described in U.S. Pat. No. 3,939,959 includes a plurality of interconnected platforms movable in an oval, substantially planar, horizontal path of travel having lengthy linear sides joined by curved ends. An acceleration zone and a deceleration zone are located at either end. The platforms are interconnected by chains or cables movably attached to cam followers. The cam followers follow acceleration and deceleration cams located beneath the platforms. The cams cause the chains or cables interconnecting the platforms to move in a manner such that platform overlap is controlled. In the accelerating and decelerating zones the platforms overlap by a substantial amount. In these regions people and/or freight board and exit from the walkway. Between the acceleration and deceleration zones are constant speed zones. In the constant speed zones the amount of platform overlap is at a minimum, whereby the relative speed of movement is at a maximum.

Various types of apparatus have been proposed for driving accelerating and decelerating moving walkways. The particular system described in U.S. Pat. No. 3,939,959 comprises a plurality of collars located beneath the platforms and affixed to a driven chain or belt. The collars are adapted to grip drive lugs that project downwardly from support plates mounted beneath the platforms. Since the collars are driven, they move a platform when its lug is gripped by a collar. And, since the platforms are interconnected, the gripped, driven platforms move the nongripped platforms. This mechanism has a number of disadvantages that make it undesirable for widespread use in a various environments. For example, because the interconnection system is mechanical, it is subject to wear and breakdown. As a result constant maintenance is necessary.

In the past, linear induction drive systems have been proposed for use in a number of environments. For example, they have been proposed for use in moving monorail passenger cars. However, monorail passenger car systems differ substantially from moving walkways in that they include separable items, e.g., a single car or several cars that can be independently accelerated or decelerated in accordance with the energy applied to the linear induction drive system at various points. Contrariwise, a moving walkway comprising a series of platforms that encompass an entire path of travel. In this regard, proposals have also been made to use linear induction drive systems in conjunction with moving walkways that do not include acceleration and deceleration zones. Because such walkway systems do not provide the acceleration and deceleration benefits, their usefulness is limited. More importantly, however, because they do not include acceleration and deceleration zones, relatively conventional linear induction drive systems can be used.

One proposal to utilize a linear induction drive system for an accelerating and decelerating moving walkway system that does not include overlapping platforms has been made. That proposal is described in U.S. Pat. No. 3,693,549 entitled "Conveyors" by Gerard Cuenord et al. The moving walkway described in U.S. Pat. No. 3,693,549 is based on sliding of the peripheral edges of the platforms in acceleration and deceleration zones. The linear induction drive system disclosed in this patent will not work satisfactorily with an overlapping type acceleration and deceleration moving walkway using a center platform cam/cable coupling arrangement because the coupling arrangement prevents the inductive interaction with the main body of the platforms, required by this patented system, from occurring.

Furthermore, the reaction rail mechanisms of many prior art devices is often formed in an arm or bracket that projects downwardly at right angles to the path of travel of the platforms being moved. This arrangement is particularly disadvantageous when it is desired to form an accelerating and decelerating moving walkway having a low profile, i.e., a minimum amount of vertical height from the floor or ground on which the moving walkway is mounted.

Therefore, it is an object of this invention to provide a new and improved linear induction drive system.

It is a further object of this invention to provide a new and improved linear induction drive system for a moving walkway that does not increase the vertical profile of the walkway.

It is yet another object of this invention to provide a new and improved linear induction drive system for an accelerating and decelerating moving walkway.

It is a still further object of this invention to provide a new and improved reaction rail suitable for use in a linear induction drive system.

SUMMARY OF THE INVENTION

In accordance with this invention a linear induction drive system, particularly useful for moving the platforms of an accelerating and decelerating moving walkway wherein the platforms are interconnected by a cable and have a cam controlled overlap, is provided. The linear induction drive system comprises a plurality of stationary linear induction motor stators located in one or more of the constant speed zones of the walkway. Rotatably attached to the platforms are reaction rails formed of a plurality of multiple laminate links. The links are rotatably attached to one another (as well as to the platforms) such that the links fold in an accordian manner in the acceleration and deceleration zones. The links fold in a plane parallel to the plane of motion of the platforms whereby link folding does not contribute to the vertical height of the overall moving walkway.

In the preferred form of the invention, a pair of links are associated with each platform. One link is rotatably attached to each platform and the other links rotatably connect the platform links together. Preferably the ends of the links butt together and the joint is overlapped by plates that are hinged to each link so that the links can be folded to the point where they lie parallel to one another.

Preferably each link is flat and elongate. Moreover, preferably, each link comprises at least a pair of laminations. The lamination nearest to the linear induction motor stators is formed of electrical conducting, nonmagnetic materials, such as aluminum or copper. The other lamination is formed of a magnetic material, such as iron. More preferably, for structural and ease of formation reasons, each link comprises a pair of electrically conducting nonmagnetic outer laminations and a magnetic inner lamination. Finally, preferably, the link connecting plates are coplanar with the outer laminations, and formed of the same material, whereby eddy currents induced by the magnetic field produced by the linear induction motor stators are produced in these plates (particularily the plate nearest the linear induction motor stators) as well as in the outer laminations.

In opertion, the links are linearly aligned in the constant speed zones whereat they pass through the magnetic field produced by the linear induction motor stators. In the acceleration and deceleration zones the links fold in an accordain manner, as the platforms overlap. This arrangement is admirably suited for use with an acceleration and deceleration moving walkway because it does not add to the vertical height of the walkway yet provides reaction rails that can be brought into close proximity with the linear induction motor stators in the constant speed zones. As noted above eddy currents are induced in the outer laminations (primarily in the outer lamination nearest to the linear induction motor stators) by the magnetic field produced by the linear induction motor stators. These currents develop a magnetic field that opposes the stator fields. The opposed magnetic field interaction produces thrust. The magnetic lamination provides a flux path between the poles of the linear induction motor stators and, thereby, improves their efficiency. Since the platforms are interconnected to one another the application of a drive force in the constant speed zones maintains the platforms, which encompass the entire path of travel of the walkway, in constant motion.

BRIEF DESCRIPTION OF THE DRAWINGS

The foregoing objects and many of the attendant advantages of this invention will become more readily appreciated as the same becomes greater understood by reference to the following detailed description when taken in conjuction with the accompanying drawings wherein:

FIG. 1 is a top plan view of an accelerating and decelerating moving walkway including platforms that overlap by varying amounts depending upon the particular zone within which a particular platform is located;

FIG. 2 is a side elevational view of the accelerating and decelerating moving walkway illustrated in FIG. 1;

FIG. 3 is a schematic view of a mechanism of the general type illustrated and described in more detail in U.S. Pat. No. 3,939,959 for causing platforms to accelerate and decelerate;

FIG. 4 is a top plan view of a linear induction drive system formed in accordance with the invention;

FIG. 5 is a side elevational view of the linear induction drive system illustrated in FIG. 4 only, taken along line 5—5;

FIG. 6 is a cross-sectional view of the linear induction drive system illustrated in FIG. 4, taken along line 6—6;

FIG. 7 is a top view of the foldable links of a reaction rail formed in accordance with the invention coupled together;

FIG. 8 is a detail view illustrating the attachment of a reaction rail link to one of the platforms taken along line 8—8 of FIG. 7; and, FIG. 9 is a cross-sectional view taken along line 9—9 of FIG. 7.

DESCRIPTION OF THE PREFERRED EMBODIMENT

Prior to describing a linear induction drive system formed in accordance with the invention, a brief discussion of an accelerating and decelerating moving walkway with which such a linear induction drive system is useful is described. In this regard, attention is directed to U.S. Pat. No. 3,939,959, noted above, for a more detailed discussion of the type of accelerating and decelerating moving walkway herein described.

FIGS. 1 and 2 illustrate a moving walkway with which the linear induction drive system of the invention is useful. The moving walkway illustrated in FIGS. 1 and 2 comprises a plurality of platforms 31 which move in an oval, substantially planar track 11 formed in a housing 13. The oval, substantially planar track includes two parallel sides 15 and 17 connected by curved end regions 19 and 21. The curved end regions 19 and 21 are covered by covers 23 and 25 that form a part of the housing 13. Short ramps 27 and 29 lead up to and down from the covers 23 and 25. Each parallel side 15 and 17 is broken into three zones—an acceleration zone; a constant speed zone; and a deceleration zone. The platforms move through these zones from left to right for the lower side 17, as viewed in FIG. 1 and vice versa (i.e., right to left) for the upper side 15, also as viewed in FIG. 1.

The plurality of platforms 31 continuously move through the oval track 11, as long as power is applied to the drive system. Thus, the platforms are continuously passing through the two acceleration zones, the two constant speed zones and the two deceleration zones; and, through the curved end regions 19 and 21.

Each end of the moving walkway illustrated in FIGS. 1 and 2 includes an entry region and an exit region. Entry is into the acceleration zones and exit is from the deceleration zones. Thus, people desiring to use the walkway illustrated in FIG. 1 (or freight to be transported by the walkway) enter the side 17 of the oval track, illustrated in the lower portion of FIG. 1, from the left and exit from the right side and vice versa for the other side 15—as illustrated by the entry and exit arrows. Drive units 33 and 35 formed in accordance with the invention are located in one or both of the constant speed zones. Preferably, a drive unit is located in each of the constant speed zones and encompasses the entire constant speed zone, even though a drive unit could be located in only one of the constant speed zones or drive units could emcompass only a portion of each of the constant speed zones. The drive units cause the platform 31 to constantly move about the oval, substantially planar track in the desired manner.

Preferably, as best illustrated in FIG. 2, accelerating and decelerating handrails 37 are located along both edges of both of the parallel sides 15 and 17 of the oval track 11. Since the accelerating and decelerating handrails form no part of this invention, they are not further described herein. They may, however, be formed of suitable types of platform like sections that accelerate and decelerate in zones corresponding to the platform accelerating and deceleration zones. In addition, side handrails 39, located on either side of the ramps 27 and 29, and the covers 23 and 25, may be included if desired. The side handrails may align with the accelerating and decelerating handrails.

As will be better understood from reviewing U.S. Pat. No. 3,939,959, each of the platforms is generally planar and includes an axle 41 (FIG. 3) located beneath its leading edge. Located on either end of the axles 41 are wheels 43 that move on tracks 49. The trailing edge of each platform overlies the axle region of the immediately following platform. Thus, the leading edge of each platform is supported by the axle and wheels and the trailing edge of each platform is supported by the following platform. Rotatably attached, at one end, to each of the axles 41 are a pair of arms 45. One of the arms is rotatably attached to each axle between the midpoint of the axle and one of the wheels 43. The arm axis of rotation is perpendicular to the horizontal plane of the path of travel of the platforms. The arms extend outwardly from the axles 41 in a direction opposite to the direction of movement of the platforms. Projecting downwardly from the outer ends of the arms are cam followers.

Located beneath the axles 41 and arms 45, on opposite sides of the centerline of the path of travel of the platforms, are a pair of elongate (strip) cams 47. The cams 47 lie slightly below the axles 41. In the direction of platform movement, the elongate cams 47 diverge in the deceleration zones and converge in the acceleration zones. If desired, the cams may be dispensed with in the constant speed zones; or, they may lie parallel to one another, near the centerline of the path of travel. The cam followers located on the outer ends of the arms 45 impinge on the outer face of the cams 47.

A separate chain or cable 51 interconnects each platform with the immediately following platform. The chain or cable wraps around pulleys or sheaves located on the outer ends of the arms 45 and on flanges connected to the axles 41. As the platforms approach a deceleration zone, where the cams 47 diverge from the centerline of the platform path of travel of the walkway, the amount of cable connecting adjacent platforms decreases and the amount of platform overlap increases. In the acceleration regions, the cams start in a spaced apart position and converge toward the centerline of the path of travel whereby cable length increases and platform overlap decreases. Because platform overlap increases in the deceleration zones a relative deceleration of objects (e.g., people or freight) carried by the walkway occurs. Because of a decrease in platform overlap in the acceleration zones a relative acceleration occurs. Reference is hereby made to U.S. Pat. No. 3,939,959 for a more detailed description of this interconnection system and its manner of operation.

Turning now to a description of the preferred embodiment of a linear induction drive system formed in accordance with the invention, FIG. 4 illustrates a section of a constant speed zone that includes a linear induction drive system formed in accordance with the invention. In the constant speed zone, elongate supports 48 lie parallel to one another and near the centerline of the path of travel of the platforms. For purposes of discussion, as best seen in FIG. 6, the illustrated elongate supports 48 are C channels mounted in a spaced, back-to-back manner across horizontal, supporting C channels 61. The supporting C channels lie orthogonal to the path of travel of the platforms and support both the tracks 49 on which the wheels 43 move, and the elongate supports 48. Mounted between the elongate supports 48, along the path of travel of the platforms, at spaced positions, are a plurality of linear induction motor stators 63. Rotatably mounted between the elongate supports 48, and between the linear induction motor stators 63, are a plurality of rollers 65. Two rollers are located between each adjacent pair of linear induction motor stators 63 and the axis of rotation of the rollers is horizontal and orthogonal to the centerline of the path of travel of the platforms. The rollers 65 are sized such that their upper periphery lies slightly above the upper surface of the linear induction motor stators 63.

Affixed to the midpoints of the axles 41 of the platforms 31 is a reaction rail 67. The reaction rail 67 is made up of a plurality of flat links, two of which 69a and 69b are associated with each platform. One (platform) link 69a of each pair of links is rotatably attached at its center to the center of the axle 41 of the associated platform. The other (interconnecting) link 69b of each pair connects adjacent platform links 69a. The axes of rotation of the attachment of the links to the axles and of the attachment of the links together is perpendicular to the path of travel of the platforms. Preferably, the platform links are attached by bolts 71 mounted in a vertical aperture 72 formed in a downwardly projecting protrusion 70 forming part of the axles 41. As a result, the reaction rail lies beneath the arms 45 and the elongate cams 47. The elongate cams may be supported on horizontal plates (not shown) lying above the reaction rail and projecting inwardly from a support member lying near the inner side of the wheels 43 and upon the support C-channels 61. The space between the cams provides an aperture through which the protrusions 70 extend.

The lower ends of the bolts 71 are rotatably attached to the center of the related platform links 69a. As illustrated in FIG. 8, coil springs 73 are mounted on the bolts, between nuts 74 affixed to the lower ends of the bolts 71 (above the links) and the axles 41. The coil springs create a downward force that maintains the reaction rail in contact with the rollers 65 as the reaction rail 67 passes over the linear induction motors stators 63, so that a precise air gap is maintained between the reaction rail and the magnetic pole faces of the stators, regardless of external influences such as magnetic repulsive forces developed between the reaction rail and the stators, rail thickness variations, etc. Preferably, a slight attractive force exists between the stators and the reaction rail that also assists in maintaining the desired air gap.

The interconnecting links 69b are equal in length to the platform links 69a. The interconnecting links 69b and the platform links 69a are hinged together in a manner that provides a smooth continuous surface over the linear induction motor stators 63. The hinge connection is such that the links smoothly shift from a straight line position over the linear induction motor stators 63 located in the constant speed zones to a compressed (accordian) position in the acceleration, deceleration and end zones.

Each of the links comprises a pair of outer elongate, planar laminations 75 and 77 formed of an electrically conducting, nonmagnetic material such as aluminum or copper and a central elongate, planar lamination formed of a magnetic material 79 such as iron. Eddy currents, induced by the magnetic fields produced by the linear induction motor stators, are developed in the nonmagnetic laminations 75 and 77. The eddy currents, in turn, produce magnetic fields that oppose the fields produced by the linear induction motor. The resultant magnetic field interaction produces thrust. The magnetic lamination 79 provides a flux path between the poles of the linear induction motor stators that improves efficiency. Since the majority of the eddy currents are produced in the outer lamination nearest to the linear induction motor stator, the other outer lamination is not absolutely necessary for the drive to operate. Rather, the other outer lamination is provided to increase the structural strength of the links and because the links are more easily formed and assembled if similar outer laminations are provided.

The reaction rail links 69a and 69b are hinged together by a double-hinge arrangement that only allows hinge movement in one direction. The hinge structure is formed such that the reaction rail surfaces remain smooth. The hinge structure is also formed such that both the outer laminations and the inner lamination are substantially continuous, as a result of edge to edge contact between related laminations.

The double acting hinge arrangement that connects the reaction rail links together comprises: the outer ends of the magnetic laminations 79; a pair of top and bottom plates 80 and 82 formed of the same material, and equal in thickness and width to the nonmagnetic laminations 75 and 77; and, a pair of pins or rivets 81 having countersunk heads. The outer ends of the magnetic laminations 79 extend beyond the outer ends of the nonmagnetic laminations 75 and 77. One corner 84 of the outer ends of the magnetic laminations is circular and the other is right angular. Where joined in the manner herein described the circular corners face one another and hinge action occurs about these corners. The outer ends 85 of the nonmagnetic laminations are concave circular. The radius of curvature has a center at the center of the aperture in which the pins or rivets 81 are mounted, as herein described. The top and bottom plates 80 and 82 fill the gap between adjacent concave circular ends of the nonmagnetic laminations 75 and 77 when a pair of links are arrayed end to end. Thus, the ends of the plates are convex circular and overlie the magnetic laminations 79. The pins or rivets 81 are mounted so that they pass orthogonally through the plates 80 and 82 and the end of the magnetic laminations 79 that the plates overlie. A washer shaped spacer 83 surrounds the pins 81 in the plane of the magnetic lamination 79. The spacer 83 is slightly thicker than the magnetic lamination and is included at each joint to maintain clearance so that the joints will pivot freely after the links are secured by upsetting the counter sunk heads of the pins or rivets 81.

It will be appreciated from the foregoing description that a reaction rail 67 formed of a plurality of links 69a and 69b is provided by the invention. The reaction rail is formed such that its links are in elongate linear positions in the region of the linear induction motor stators 63, which are located in the constant speed zones where the platforms have a minimum amount of overlap. When the platforms are in the acceleration, deceleration or curved end regions, the links fold in an accordian fashion to compensate for the change in platform overlap. The direction of folding is in a plane parallel to the plane of the path of travel of the platforms and the hinge action is outwardly, i.e. away from the centerline of the platform path of travel. The reaction rail folding action does not contribute to the overall height of the moving walkway because link folding occurs in a parallel plane. The rollers 65 maintain the reaction rail spaced from the upper surface of the linear induction motor stators 63 by an amount that provides for maximum magnetic field interaction. As a result, maximum thrust is provided. Moreover, the reaction rail is formed such that while thin, a maximum amount of linearly induced thrust is created in the constant speed zones. As noted above, the inclusion of a magnetic material lamination, improves the flux paths between the poles of the linear induction motor stators and, thereby, improves overall efficiency.

It will be appreciated from the forgoing description that the invention provides a linear induction motor drive system that is particularly suitable for use with an accelerating and decelerating moving walkway wherein platform overlap varies, depending upon the position of a particular platform along the path of travel of the moving walkway. While the invention is particularly suited for use with accelerating and decelerating moving walkways, it can also be utilized with a constant speed moving walkway, if desired. However, in such a case, except for the curved end regions, the advantages provided by an accordian type folding reaction rail are not utilized to the maximum. On the other hand, the benefits of a lamination type reaction rail including a central lamination formed of a magnetic material are still obtained.

While a preferred embodiment of the invention has been illustrated and described, as will be appreciated by those skilled in the art and others, various changes can be made therein without departing from the spirit and scope of the invention. Hence, the invention can be practiced otherwise than as specifically described herein. In this regard, in some instances, it may be desirable to utilize a link arrangement wherein a single link is associated with each axle and mounted such that the links bend in opposite directions. However, it will be appreciated that while such an arrangement will have an accordian ability, the amount of platform overlap change may be substantially reduced, depending upon the length of the axles, the size of the platforms and other related factors.

The embodiments of the invention in which an exclusive property or privilege is claimed are defined as follows:

1. A linear induction drive system for a moving walkway formed of a plurality of platforms movable in a planar path of travel comprising:
   (a) a plurality of stationary linear induction motor stators located on one side of said plurality of platforms, along said path of travel; and,
   (b) a reaction rail comprising:
      (1) a plurality of elongate flat links rotatably attached to said platforms so as to pass over said stationary linear induction motor stators and through the magnetic field produced by said stationary linear induction motor stators, said plurality of elongate flat links lying in a plane parallel to the plane of movement of said platforms, each of said reaction rail links comprising a plurality of laminations, said plurality of laminations including an electrically conducting nonmagnetic lamination and a magnetic lamination; and,
      (2) hinge means for rotatably connecting adjacent links together, the axis of rotation of said rotatable attachment of said links to said platforms and the axis of rotation of said hinge means being oriented such that said links fold in said plane parallel to the plane of movement of said platforms.

2. A linear induction drive system as claimed in claim 1 wherein each of said links includes a second electrically conducting nonmagnetic lamination, said electrically conducting nonmagnetic laminations being located on opposite sides of said magnetic lamination.

3. A linear induction drive system as claimed in claim 2 wherein:
said plurality of links include platform links and interconnecting links, said platform links being rotatably connected to said platforms on a one-to-one basis and said interconnecting links being located between adjacent platform links; and,
said hinge means includes a plurality of hinge mechanism, each hinge mechanism connecting one end of an interconnecting link to an adjacent end of a platform link.

4. A linear induction drive system as claimed in claim 3 wherein:
said magnetic laminations of said links extend beyond the ends of said electrically conducting nonmagnetic laminations; and,
said hinge mechanisms each include plates formed so as to overlie adjacent extended ends of said magnetic laminations and pins mounted so as to rotatably connect said overlying plates to said extended ends of said magnetic laminations.

5. A linear induction drive system as claimed in claim 4 wherein said plates are formed of an electrically conducting nonmagnetic material similar to the material forming the electrically conducting nonmagnetic laminations of said links.

6. A linear induction drive system as claimed in claim 5 wherein one of the corners of the magnetic laminations of adjacent links is circular and the other corner is rectangular and wherein the ends of adjacent electrically conducting nonmagnetic laminations are concave circular and the ends of the plates are correspondingly convex circular.

7. A linear induction drive system as claimed in claim 6 wherein said plurality of stationary linear induction motor stators are spaced from one another and including rollers located between adjacent stationary linear induction motor stators, said rollers adapted to impinge on said reaction rail so as to maintain a fixed distance between said reaction rail and the magnetic pole faces of said stationary linear induction motor stators.

8. A linear induction drive system as claimed in claim 7 wherein the rotatable connection between said platform links and said platforms is spring loaded so as to create a force pressing said reaction rail against said rollers.

9. A linear induction drive system as claimed in claim 1 wherein:
said plurality of links include platform links and interconnecting links, said platform links being rotatably connected to said platforms on a one-to-one basis and said interconnecting links being located between adjacent platform links; and,
said hinge means includes a plurality of hinge mechanism, each hinge mechanism connecting one end of an interconnecting link to one end of a platform link.

10. A linear induction drive system as claimed in claim 1 wherein:
said magnetic laminations of said links extend beyond the ends of said electrically conducting nonmagnetic laminations; and,
said hinge mechanisms each include plates formed so as to overlie adjacent extended ends of said magnetic laminations and pins mounted so as to rotatably connect said overlying plates to said extended ends of said magnetic laminations.

11. A linear induction drive system as claimed in claim 10 wherein said plates are formed of an electrically conducting nonmagnetic material similar to the material forming the electrically conducting nonmagnetic laminations of said links.

12. A linear induction drive system as claimed in claim 11 wherein one of the corners of the magnetic laminations of adjacent links is circular and the other corner is rectangular and wherein the ends of adjacent electrically conducting nonmagnetic laminations are concave circular and the ends of the plates are correspondingly convex circular.

13. A linear induction drive system as claimed in claim 1 wherein said plurality of stationary linear induction motor stators are spaced from one another and including rollers located between adjacent stationary linear induction motor stators, said rollers adapted to impinge on said reaction rail so as to maintain a fixed distance between said reaction rail and the magnetic pole faces of said stationary linear induction motor stators.

14. A linear induction drive system as claimed in claim 13 wherein the rotatable connection between said platform links and said platforms is spring loaded so as to create a force pressing said reaction rail against said rollers.

15. In an accelerating and decelerating moving walkway comprising a plurality of interconnected platforms movable in a horizontal, planar path of travel including acceleration zones, constant speed zones and deceleration zones, the improvement comprising a linear induction drive system comprising:
(a) a plurality of stationary linear induction motor stators located beneath said plurality of platforms in at least one of said constant speed zones along said path of travel; and,
(b) a reaction rail comprising:
(1) a plurality of elongate flat links rotatably attached to said platforms beneath said platforms so as to pass over said stationary linear induction motor stators and through the magnetic field produced by said linear induction motor stators, said plurality of elongate flat links lying in a horizontal plane parallel to the horizontal, planar path of travel of said platforms, each of said reaction rail links comprising a plurality of laminations, said plurality of laminations including an electrically conducting nonmagnetic lamination and a magnetic lamination; and,
(2) hinge means rotatably connecting adjacent links together, the axis of rotation of said rotatable attachment of said links to said platforms and the axis of rotation of said hinge means being oriented such that said links fold in said horizontal plane parallel to the horizontal, planar path of travel of said platforms.

16. The improvement claimed in claim 15 wherein each of said links includes a second electrically conducting nonmagnetic lamination, said electrically conducting nonmagnetic laminations being located on opposite sides of said magnetic lamination.

17. The improvement claimed in claim 16 wherein:
said plurality of links include platform links and interconnecting links, said platform links being rotatably connected to said platforms on a one-to-one basis and said interconnecting links being located between adjacent platform links; and,
said hinge means includes a plurality of hinge mechanism, each hinge mechanism connecting one end of an interconnecting link to one end of a platform link.

18. The improvement claimed in claim 17 wherein:
said magnetic laminations of said links extend beyond the ends of said electrically conducting nonmagnetic laminations; and,
said hinge mechanisms each include plates formed so as to overlie adjacent extended ends of said magnetic laminations and pins mounted so as to rotatably connect said overlying plates to said extended ends of said magnetic laminations.

19. The improvement claimed in claim 18 wherein said plates are formed of an electrically conducting nonmagnetic material similar to the material forming the electrically conducting nonmagnetic laminations of said links.

20. The improvement cliamed in claim 19 wherein one of the corners of the magnetic laminations of adjacent links is circular and the other corner is rectangular and wherein the ends of adjacent electrically conducting nonmagnetic laminations are concave circular and the ends of the plates are correspondingly convex circular.

21. The improvement claimed in claim 20 wherein said plurality of stationary linear induction motor stators are spaced from one another and including rollers located between adjacent stationary linear induction motor stators, said rollers adapted to impinge on said reaction rails so as to maintain a fixed distance between said reaction rail and the magnetic pole faces of said stationary linear induction motor stators.

22. The improvement claimed in claim 21 wherein the rotatable connection between said platform links and said platforms is spring loaded so as to create a force pressing said reaction rail against said rollers.

23. The improvement claimed in claim 15 wherein:
said plurality of links include platform links and interconnecting links, said platform links being rotatably connected to said platforms on a one-to-one basis and said interconnecting links being located between adjacent platform links; and,
said hinge means includes a plurality of hinge mechanism, each hinge mechanism connecting one end of an interconnecting link to one end of a platform link.

24. The improvement claimed in claim 23 wherein:
said magnetic laminations of said links extend beyond the ends of said electrically conducting nonmagnetic laminations; and,
said hinge mechanisms each include plates formed so as to overlie adjacent extended ends of said magnetic laminations and pins mounted so as to rotatably connect said overlying plates to said extended ends of said magnetic laminations.

25. This improvement claimed in claim 24 wherein said plates are formed of an electrically conducting nonmagnetic material similar to the material forming the electrically conducting nonmagnetic laminations of said links.

26. The improvement claimed in claim 25 wherein one of the corners of the magnetic laminations of adjacent links is circular and the other corner is rectangular and wherein the ends of adjacent electrically conducting nonmagnetic laminations are concave circular and the ends of the plates are correspondingly convex circular.

27. The improvement claimed in claim 15 wherein said plurality of stationary linear induction motor stators are spaced from one another and including rollers located between adjacent stationary linear induction motor stators, said rollers adapted to impinge on said reaction rail so as to maintain a fixed distance between said reaction rail and the magnetic pole faces of said stationary linear induction motor stators.

28. The improvement claimed in claim 27 wherein the rotatable connection between said platform links and said platforms is spring loaded so as to create a force pressing said reaction rail against said rollers.

* * * * *